(12) United States Patent
Hegler et al.

(10) Patent No.: US 10,605,391 B2
(45) Date of Patent: *Mar. 31, 2020

(54) FLEXIBLE PIPE JOINT

(71) Applicant: FLEXSTEEL PIPELINE TECHNOLOGIES, INC., Houston, TX (US)

(72) Inventors: Matthew Allen Hegler, Houston, TX (US); Andrew James Heaton, Lincolnshire (GB)

(73) Assignee: TRINITY BAY EQUIPMENT HOLDINGS, LLC, Houston, TX (US)

( * ) Notice: Subject to any disclaimer, the term of this patent is extended or adjusted under 35 U.S.C. 154(b) by 235 days.

This patent is subject to a terminal disclaimer.

(21) Appl. No.: 15/478,380

(22) Filed: Apr. 4, 2017

(65) Prior Publication Data

US 2017/0205006 A1 Jul. 20, 2017

Related U.S. Application Data

(63) Continuation of application No. 12/995,130, filed as application No. PCT/GB2009/050272 on Mar. 24, 2009, now Pat. No. 9,625,070.

(60) Provisional application No. 61/060,049, filed on Jun. 9, 2008.

(51) Int. Cl.
*F16L 33/207* (2006.01)
*F16L 33/01* (2006.01)
*F16L 55/07* (2006.01)

(52) U.S. Cl.
CPC ........... *F16L 33/2071* (2013.01); *F16L 33/01* (2013.01); *F16L 55/07* (2013.01)

(58) Field of Classification Search
USPC .... 285/13–14, 239, 242–243, 256–257, 331, 285/924
See application file for complete search history.

(56) References Cited

U.S. PATENT DOCUMENTS

| | | | | |
|---|---|---|---|---|
| 3,574,355 A | * | 4/1971 | Oetiker | F16L 33/025 285/243 |
| 3,702,707 A | * | 11/1972 | Rosan, Sr. | F16B 39/10 285/23 |
| 3,724,882 A | * | 4/1973 | Dehar | F16L 37/05 285/243 |
| 4,854,613 A | * | 8/1989 | Reece | F16B 39/10 285/39 |
| 5,072,072 A | * | 12/1991 | Bawa | H02G 3/0691 174/655 |
| 5,215,336 A | * | 6/1993 | Worthing | F16L 19/005 285/319 |
| 6,394,504 B1 | * | 5/2002 | Brummans | F16L 37/0985 285/13 |
| 6,575,500 B1 | * | 6/2003 | Wili | F16L 33/2073 285/239 |

(Continued)

*Primary Examiner* — Anna M Momper
*Assistant Examiner* — Fannie C Kee
(74) *Attorney, Agent, or Firm* — Greenberg Traurig, LLP; Dwayne Mason; Mark Chretien

(57) ABSTRACT

An apparatus for securing a flexible pipe (101) to a further flexible pipe (102) in an end-to-end configuration includes an elongate tubular element (30) having a first and second end (33, 34) and an outer surface having a raised central region (35). At least one vent passage (55) extends at least partially across the raised central region (35).

12 Claims, 9 Drawing Sheets

(56) References Cited

U.S. PATENT DOCUMENTS

| 6,737,584 B2* | 5/2004 | Kiely | H02G 3/0691 |
| | | | 16/2.2 |
| 7,007,983 B2* | 3/2006 | Arosio | F16L 37/32 |
| | | | 137/614.05 |

* cited by examiner

FLEXIBLE PIPE JOINT

BACKGROUND OF THE INVENTION

The present invention relates to a method and apparatus for securing one flexible pipe to another flexible pipe in an end-to-end configuration. In particular, but not exclusively, the present invention relates to a method of joining lengths of flexible pipe together to form a pipeline whereby gases trapped in an annulus region of a flexible pipe in one part of the pipeline can be transmitted into a corresponding annulus region in another part or parts of the pipeline.

Un-bonded flexible pipe is well-known and there are many uses for which such flexible pipe may be utilised. For example, transmitting fluid such as a production fluid like oil or gas from one location to another. Such flexible pipe may be used for offshore purposes as well as onshore or over land purposes. Typically such flexible pipe includes an inner fluid retaining layer, often referred to as a liner or barrier layer, which helps prevent fluid flow radially outwards from the bore. This layer has an inner diameter defining a bore along which fluid can flow. One or more armour layers are typically formed around the fluid retaining layer. The armour layer or layers are typically, but not exclusively, formed by winding steel strip about the fluid retaining layer. The armour layer or layers provide pressure reinforcement to prevent burst through of the inner fluid retention layer as well as preventing collapse of the flexible pipe due to external pressures. Additionally the armour layer can provide tensile strength to resist longitudinal forces of either extension or contraction on the flexible pipe. The flexible pipe also typically includes an outer sheath which is arranged to prevent ingress of fluid and/or contaminants from an environment where the flexible pipe is located.

The region between the outer sheath and inner fluid retaining layer defines an annulus region extending along the length of the portion of flexible pipe in which the armour layer or layers are located. One well known problem associated with this annular layer is that gas which penetrates through the fluid retaining layer from the transported fluid collects in the annular region. Also where the flexible pipe is utilised in an environment including undesirable gas such gas can permeate through the outer sheath and likewise be trapped in the annulus region. The trapped gases can collect and on occasion can cause rupturing in the flexible pipe or can degrade performance of the flexible pipe over time in many known ways. For this reason gases trapped in the annulus of un-bonded flexible pipe require venting. This has been achieved in the past by securing adjacent portions of flexible pipe together in a way such that a gas pathway is formed between corresponding annulus regions in adjacent flexible pipes. One or more valves have then been used to vent the gases trapped at one or more predetermined locations. In the past the pathway between connected pipes has been provided by jumper tubes. The configuration of the jumper tubes used has in the past been determined by the mechanism by which portions of flexible pipe have been secured to one another in an end-to-end configuration. For example, when end fittings have been used jumper tubes have required vent holes to be machined in each end fitting so that the jumper tube can transmit gases from one pipe end past the end fittings to the other pipe end.

Over the entire length of a pipeline formed by two or more portions of flexible pipe connected together in an end-to-end configuration the gases that accumulate in the annulus space can thus be directed to one or both ends of the pipeline or to other locations where an exit valve is located.

Unfortunately such jumper tubes are often fragile and tend to create obstructions when performing rehabilitation work. Broken jumper tubes or missing plugs in an end fitting can cause harmful gases to escape in an uncontrolled fashion or allow moisture into the flexible pipe annulus which potentially damages the flexible pipe and degrades performance.

BRIEF SUMMARY OF THE INVENTION

It is an aim of the present invention to at least partly mitigate the above-mentioned problems.

It is an aim of embodiments of the present invention to provide a method for securing an end of a first portion of flexible pipe to an end of a further portion of flexible pipe in an end-to-end configuration whereby gases trapped in an annulus region of each portion of flexible pipe are in fluid communication and can thus be vented at an end or other desired locations of the pipeline formed by the co-connected the portions of flexible pipe.

It is an aim of embodiments of the present invention to provide a flexible pipe connector which can be used to connect one portion of flexible pipe to a further portion of flexible pipe.

It is an embodiment of the present invention to provide a method and apparatus which enables gases trapped in the annulus regions of un-bonded flexible pipe to be transmitted to one or more end regions or mid sections where such gases can be vented.

According to a first aspect of the present invention there is provided apparatus for securing a flexible pipe to a further flexible pipe in an end-to-end configuration, comprising:

an elongate tubular element comprising a first and second end and an outer surface comprising a raised central region; and at least one vent passage extending at least partially across the raised central region.

According to a second aspect of the present invention there is provided A method of securing a flexible pipe to a further flexible pipe in an end-to-end configuration, comprising the steps of:

urging an end of a first flexible pipe into an annulus region between a first end of an elongate tubular element and a first jacket member;

urging an end of a second flexible pipe into a further annular region between a second end of the elongate tubular element and a second jacket member; and providing a vent path from an annular region of the first flexible pipe to a corresponding annular region of the second flexible pipe via a vent passage extending at least partially across a raised central region of the elongate tubular element.

Embodiments of the present invention provide a method by which external jumper tubes can be eliminated from a pipeline. Where adjacent flexible pipes are joined together venting paths are incorporated within a connector piece so that gases can be transmitted through the midline connection.

Embodiments of the present invention provide a vent path which is internal so as to eliminate extra tubes and any external obstructions.

Embodiments of the present invention will now be described hereinafter, by way of example only, with reference to the accompanying drawings in which:

BRIEF DESCRIPTION OF THE DRAWINGS

In the drawings like reference numerals refer to like parts.

DETAILED DESCRIPTION OF THE INVENTION

Figure 1:
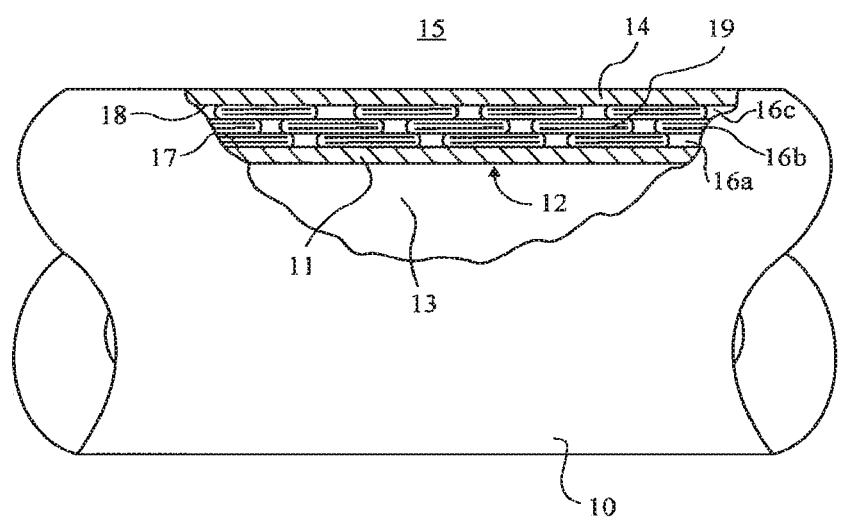
FIG. 1 illustrates a flexible pipe.

FIG. 1 illustrates a cross sectional view of a portion of flexible pipe 10. It will be understood that the longitudinal length of the flexible pipe can be from a few metres to a few kilometres or more in length. An innermost fluid retaining layer 11 has an inner surface 12 which defines a central bore 13 along which fluid can flow. The flexible pipe is applicable to the transportation of a wide variety of fluids such as water or production fluids such as oil or gas. One or more inner layers (not shown) may be provided under the fluid retaining layer.

An outer sheath 14 provides an outer protection layer which prevents ingress of contaminants as well as providing physical protection against attack from an environment 15 outside the flexible pipe.

Three layers 16a, 16b, 16c of armour protection are formed between an outer surface 17 of the fluid retaining layer and an inner surface 18 of the outer sheath 14. An annular region 19 is thus formed between the inner surface 18 of the outer sheath and outer surface 17 of the fluid retaining layer 11.

It will be understood that the armour layers 16a-16c may be provided by one or more layers of wound strips according to further embodiments of the present invention. Also whilst the strips illustrated in FIG. 1 are shown as having a substantially flat cross section, it will be understood that strip having predetermined cross sections may be used according to further embodiments of the present invention. Such strips may or may not interlock to some extent.

Figure 2:
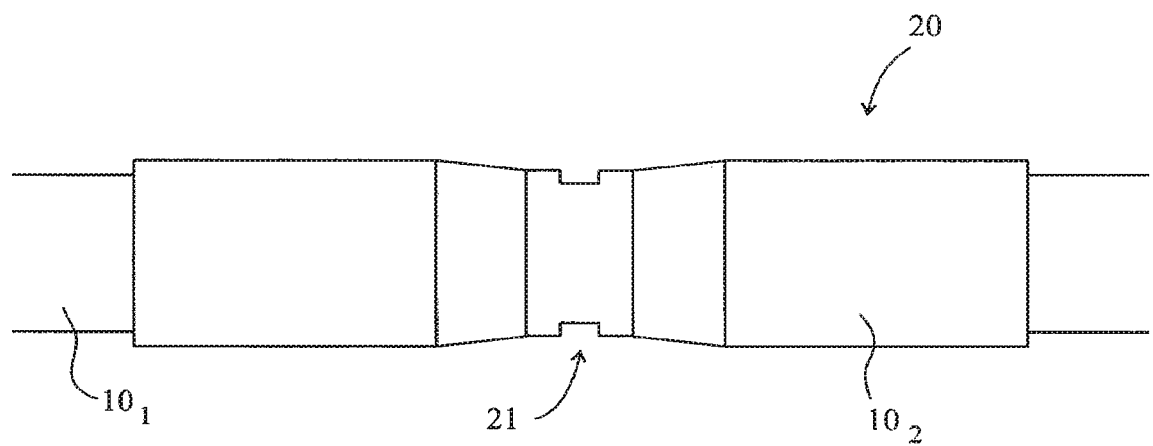
FIG. 2 illustrates a pipeline.

FIG. 2 illustrates how a pipeline 20 can be formed by joining portions of pipeline $10_1$, $10_2$ together in an end-to-end configuration via a mid-line connector 21. It will be understood that a pipeline may be formed by two or more portions of flexible pipe $10_{1, 2 \ldots n}$ each joined to one or two adjacent portions of flexible pipe by a respective connection.

Figure 3:
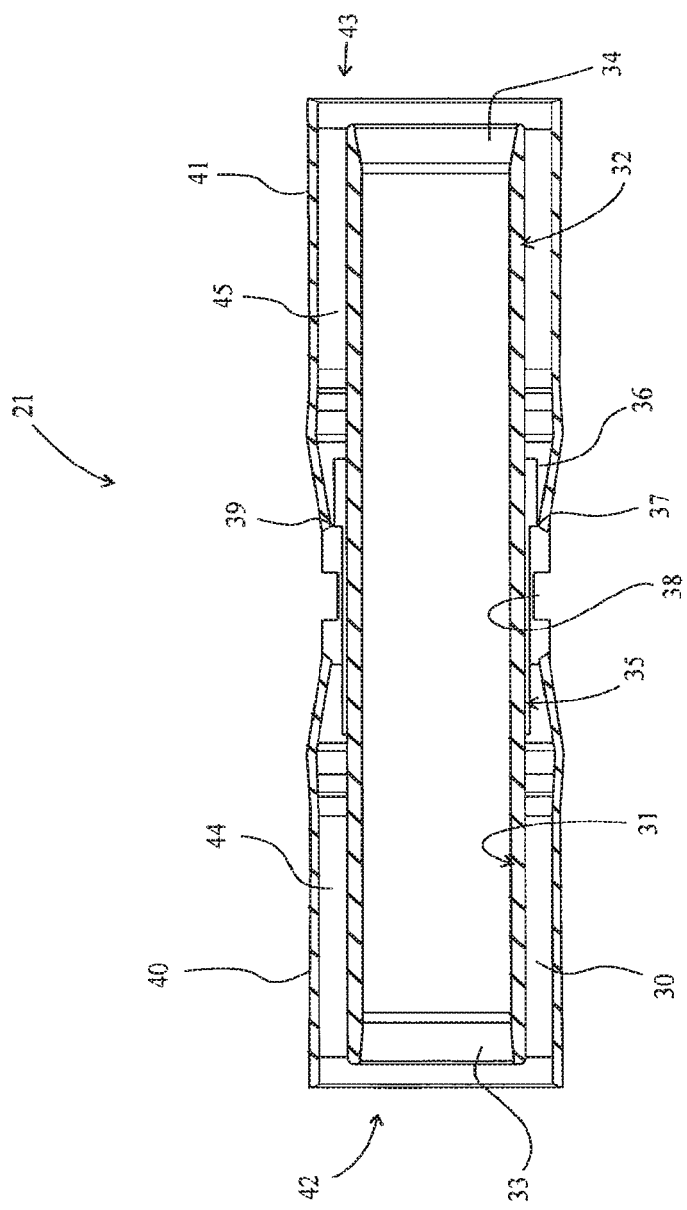
FIG. 3 illustrates a midline connector.

FIG. 3 illustrates a connector 21 useable to secure adjacent portions of flexible pipe together in more detail. The connector includes an inner cylindrical tube 30 having a substantially cylindrical inner surface 31 and an outer surface 32 which is inwardly tapered at a first open end 33 and a further open end 34. The taper helps locate the pipe ends with respect to the connector during connection.

A central region of the outer surface of the tube is stepped outwardly to form a raised central section 35. The raised portion 35 is itself stepped radially outwardly at one end 36 to form an abutment surface 37.

Prior to securing to a flexible pipe a ring 38 is slipped over the first end 33 of the tube 30. The ring has an inner diameter provided by an inner cylindrical surface having a dimension just big enough to slip over the outer diameter of the narrow end of the outer surface 35 of the raised portion of the tube. An end 39 of the ring abuts with the surface 37 of the wide end of the raised portion 36. This duly locates the ring in position.

The ring 38 has a central cut out region to aid handling. Other profiles of ring may be utilised as discussed herein below.

Subsequent to the fitting of the ring 38 about the raised central section of the cylindrical tube a first jacket 40 and further jacket 41 are secured to the connecting ring via a weldment, adhesive, bolt or screw or other such fastening mechanism. Each jacket has a respective open mouth 42, 43 and is generally cylindrical in shape with an inwardly tapered end which tapers radially inwardly at one end of the jacket. Subsequent to the jackets being secured to the ring an annulus region is defined at each end of the midline connector. The annular region 44 at a first end of the connector is defined between an outer surface of the cylindrical tube and an inner surface of a respective jacket 40. A further annulus region 45 is defined between an outer surface of a further end of the tube and an inner surface of a remaining jacket 41. It will be understood that the jackets may be secured to other locations of the connector 21.

Figure 4:
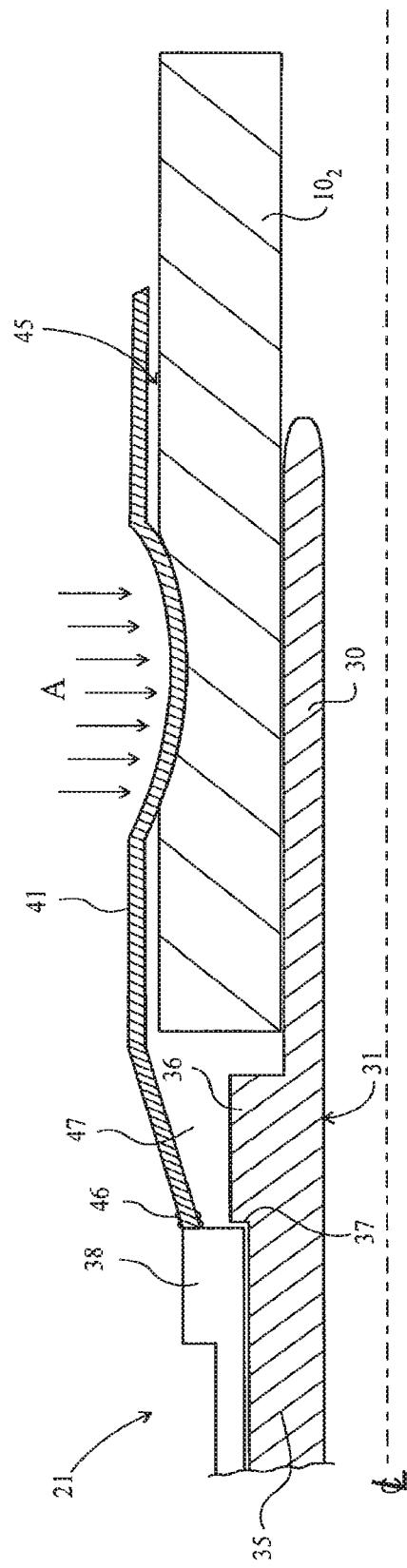
FIG. 4 illustrates a flexible pipe connected to a connector.

FIG. 4 illustrates how an end of a flexible pipe $10_2$ may be secured at one end of the midline connector 21 between a jacket 41 secured to the ring 38 mounted on the midline connector 21. Subsequent to securing the jacket 41 to the connector ring via the weldment 46 or other such fastening, an end of the flexible pipe $10_2$ is introduced into the annulus region 45. Subsequently during a swaging process the jacket 41 is deformed by a force exerted as shown by arrow A in FIG. 4 which locks the pipe end in the connector. It will be appreciated that other fastening techniques, such as bolting, gluing, welding or the like, may be utilised to secure the end of the flexible pipe to the jacket 41 and tube 30.

As illustrated in FIG. 4 an open end of the flexible pipe is thus in fluid communication with a space 47 which is a part of the annular region between the jacket and cylindrical body 30. As such the annular region formed between the outer surface 17 of the fluid retaining layer and inner surface 18 of the outer sheath will vent directly into this space 47. From there fluid flow occurs via passageways formed as bores or slots through the cylindrical body 30 and/or ring 38 to a corresponding space at the other end of the midline connector. From there fluid venting from one flexible pipe can pass into the corresponding annular region of the adjacent flexible pipe portion.

Figure 5:
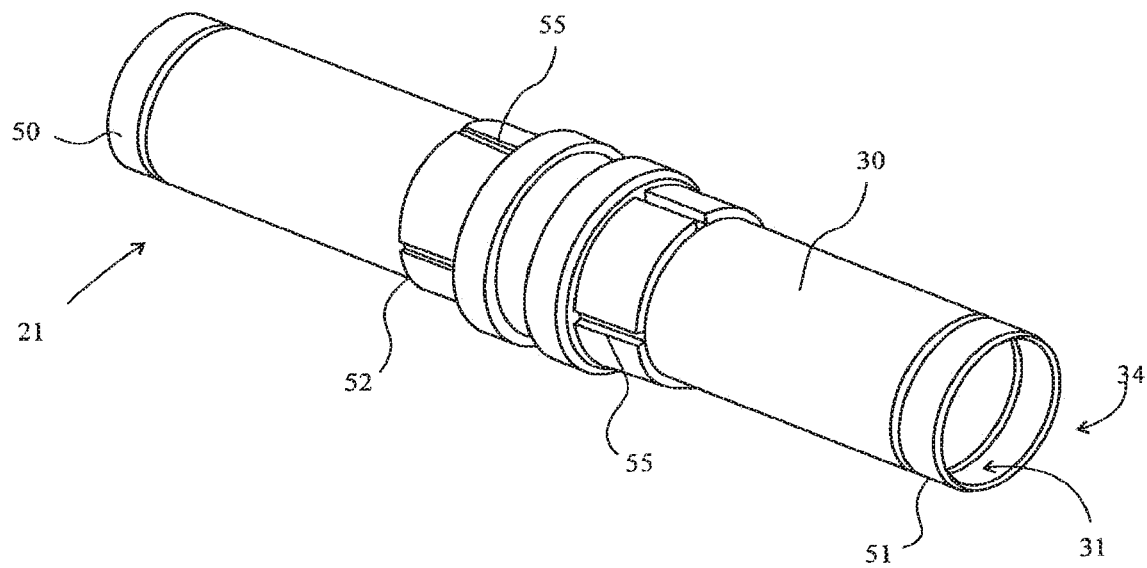
FIG. 5 illustrates part of a midline connector.

FIG. 5 illustrates a further view of a midline connector 21 before jackets are attached. The connector has a cylindrical body 30 having a substantially cylindrical inner surface 31 which defines an internal bore along which fluid can flow through the connector and along the pipeline in general. The outer surface 32 of the connector is tapered inwardly towards a first open end to thereby define an inwardly extending region 50 extending circumferentially around the body. At a further open end 34 a further circumferentially extending tapered region 51 is formed. A central region of the outer surface of the cylindrical body is stepped radially outwardly at a first end 52 to provide a raised outer surface which is generally cylindrical. This extends to a further end region 36 of the central raised section 35 of the connector. As illustrated in FIG. 5 an end 52 of the raised section thus extends radially outwardly less than the other end 36 of the raised section. A ring 38 is slid over the central raised region from the first end 52 and along the raised section until the ring abuts with the radially outwardly extending step at the further end of the raised region. This duly locates the ring in position.

As illustrated in FIG. 5 slots 55 are formed in the raised central section of the connector. One or more slots can be preformed and as illustrated in FIG. 5 the slots extend across the whole width of the central raised section. It will be appreciated that the slots may be formed less than the whole way through the raised portion according to further embodiments of the present invention. The ring 38 covers a central region of each of the slots when duly located.

Figure 6:
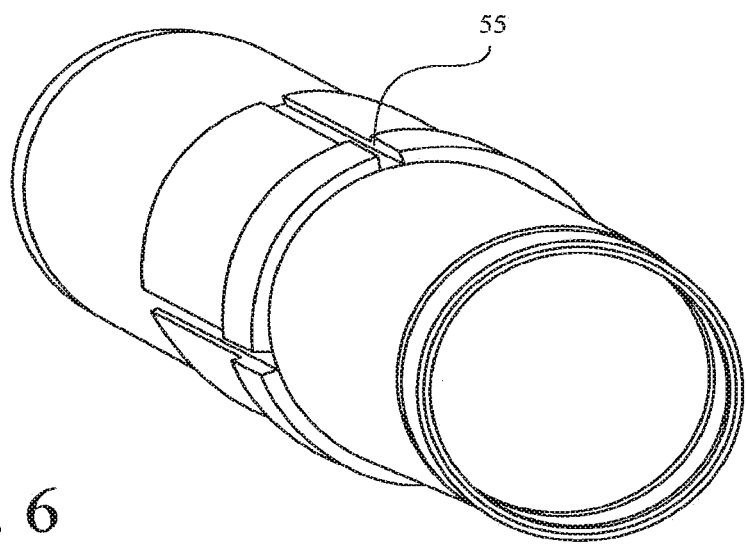
FIGS. 6, 6A and 6B illustrates alternate embodiments of a part of the connector.
Figure 6A:
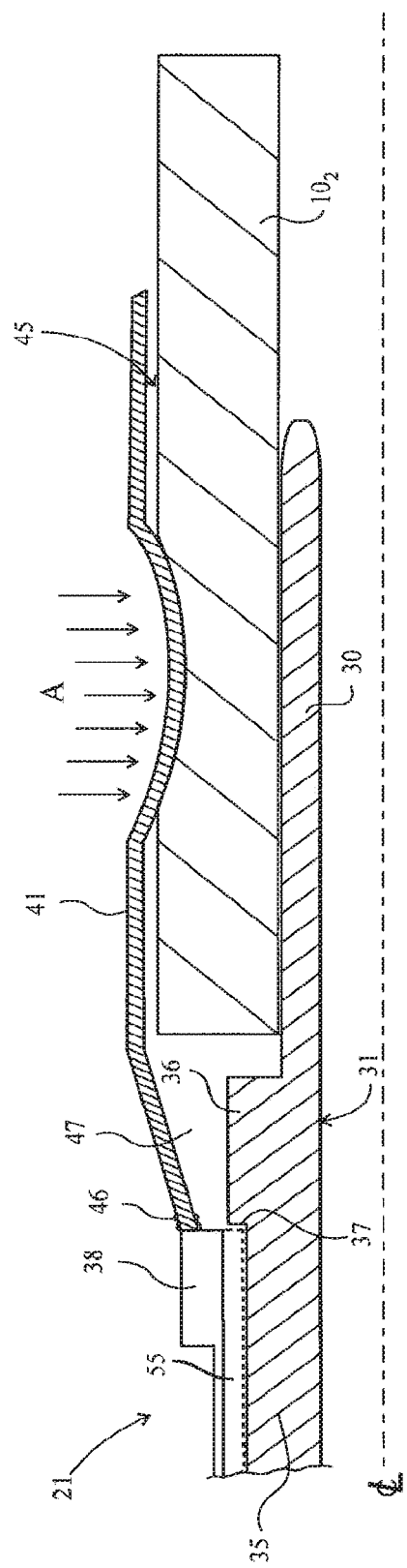
Figure 6B:
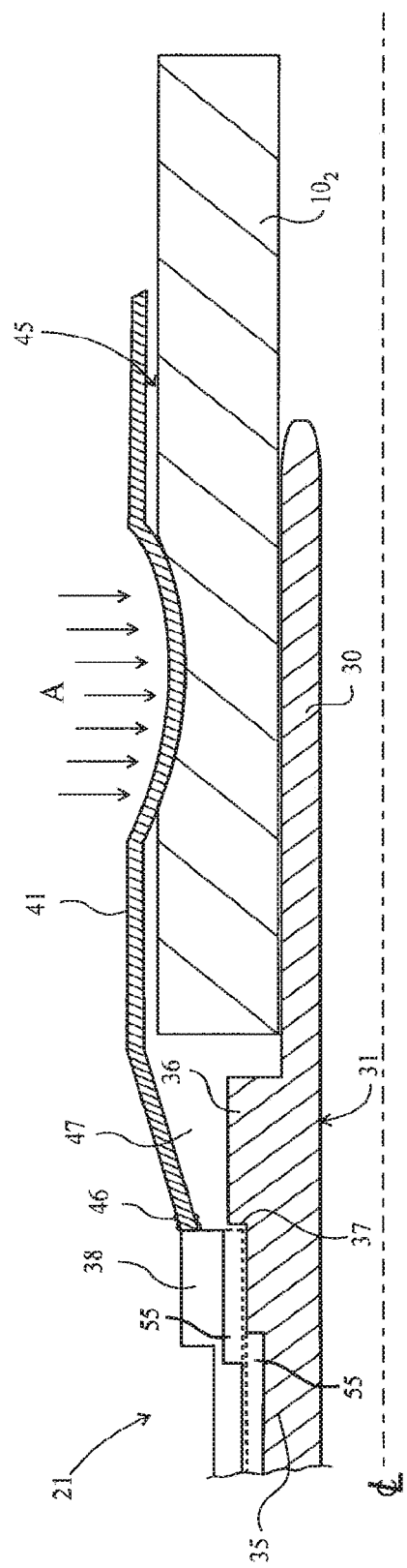

FIG. 6 illustrates the raised central portion of the connector and the slots 55 prior to the ring being put in position. FIG. 6 also illustrates how an outer surface of the raised central section is stepped. It will be appreciated that in use the slots 55 provide a vent passage along which fluid such as gas or liquid can flow when the pipeline is in operation. To this end the vent passage can, instead of a slots, be formed as a through bore or partial through bore through the raised central section of the connector. Still further alternative embodiments include one or more slots or bores formed at one or more predetermined locations on the ring which communicate with partial mating passages formed by slots or bores in the raised central region of the connector, as illustrated in FIG. 6B. It will be appreciated that the raised central region of the connector may be integrally formed with the cylindrical body as illustrated in FIGS. 5 and 6 or alternatively may be a separate unitary or multi-piece unit secured to the cylindrical body prior to application of the ring.

Figure 7:
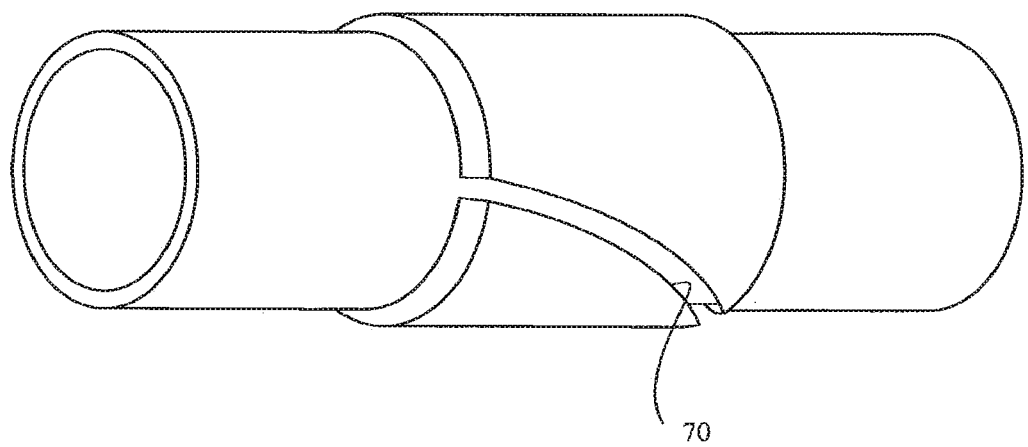
FIG. 7 illustrates an alternative midline connector.

FIG. 7 illustrates an alternative embodiment of the connector shown in FIG. 6 and illustrates how the slots 55 may be alternatively formed as curved or labyrinthine passageways through the raised section. Although the curved slot 70 illustrated in FIG. 7 is shown passing the whole way through the raised section in the middle of the connector alternative embodiments of the present invention can make use of one or more curved slots which pass only a partial way through the raised portion.

Embodiments of the present invention eliminate flanged or welded end fittings for the purpose of connecting two sections of flexible pipe together. The connector is installed as a coupling that reduces leak potential caused by two flanged end fittings which would otherwise be used according to the prior art. The midline connector also eliminates the need for welding two separate end fittings together as per the prior art.

The connector "grabs" two ends of flexible pipe from the inner and outer diameters. The tubular body contacts an inner diameter of each flexible pipe and a centering ring is used to hold the connector during a swaging operation. External jackets are welded to the centering ring and these can be used to grab the outer diameter of the flexible pipe.

Venting is incorporated between the inner body and centering ring by means of slots or other types of passage. The slots can be cut axially along a section of the body outer diameter or alternatively can be helically formed. Slots may be on the raised portion of the cylindrical body and/or an inner surface of the ring, as shown in FIGS. 5, 6, 6A, 6B and 7.

The body and centering ring are concentrically mated together and form vent paths completely enclosed within the midline connector.

Slots machined on the outer diameter of the body may alternatively take the form of a helix or labyrinthine structure wrapping around the raised surface of the body outer diameter. This is advantageous during a manufacturing process as lathes may be used to machine the body without independent milling capabilities.

Alternative embodiments of the present invention utilise a design which includes mating the body and centering ring by loose fitting threads which allow gases to pass through the helical gaps in the threads.

Figure 8:
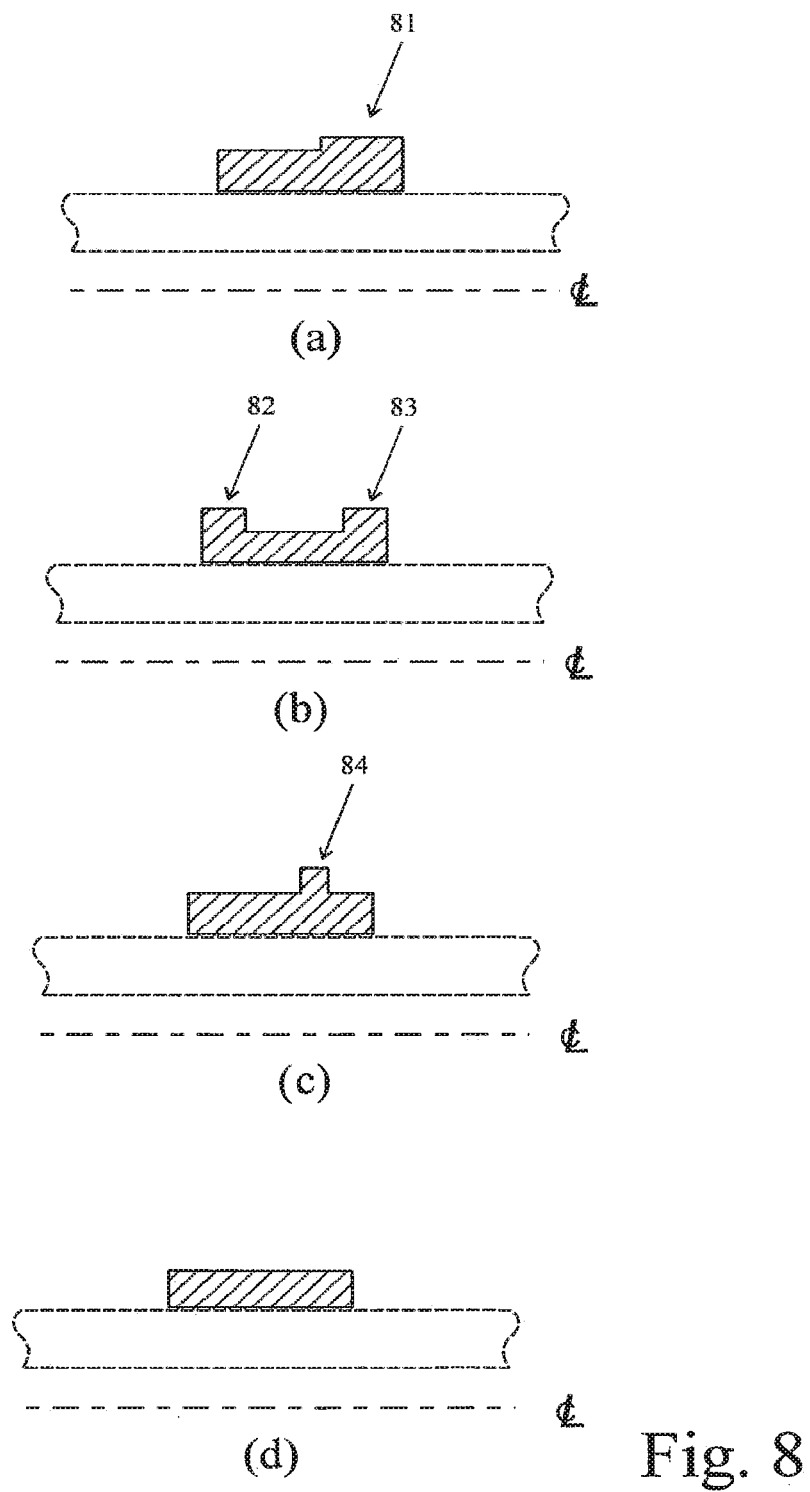
FIG. 8 illustrates alternative ring shapes.

FIG. 8 illustrates alternative cross sectional views of a centering ring 38. FIG. 8b illustrates the cross section of ring illustrated in the previous drawings. FIG. 8a illustrates a substantially cylindrical ring with a radially outwardly stepped raised portion 81 at a predetermined end. As shown in FIG. 8b the outer surface of the ring may alternatively have a raised portion 82, 83 at each longitudinal end. FIG. 8c illustrates a raised portion 84 which extends radially outwardly from a substantially cylindrical body within the ends of the ring but offset from a central point. FIG. 8d illustrates how a substantially cylindrical ring may be utilised. It will be appreciated that further cross sections of ring may be utilised according to still further embodiments of the present invention.

Prior art connections for securing flexible pipe together have transmitted gases between two separate sections of flexible pipe by incorporating external components connected to end fittings. These external components, such as jumper tubes, were connected to jackets or other portions of a connector by either welding or threading components. The present invention eliminates all external components and the process of connecting external components to end fittings. The internal nature of the venting provided by embodiments of the present invention provides a more direct path for the gas transmittal, thus reducing the possibility of an obstructed path. Pressure build-up within annulus spaces caused by blocked gas can cause rupture of the outer shield layer of the flexible pipe and this is avoided according to embodiments of the present invention.

The midline connection is thus a multi-part system that "grabs" two ends of flexible pipe from the inner and outer diameters. The midline connection includes an inner body formed as a tube that contacts an inner diameter of the pipe. A centering ring is used to hold the midline connection during a swaging operation and external jackets are welded to the centering ring. These external jackets are used to grab an outer diameter of each flexible pipe.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

We claim:

1. An apparatus for securing a flexible pipe to a further flexible pipe in an end-to-end configuration, comprising:
   an elongate tubular element comprising a first and second end and an outer surface comprising a raised central region;
   a ring member located entirely over a portion of the raised central region of the tubular element; and
   a slot formed in an outer surface of the raised central region and extending at least partially across the raised central region, or formed in an inner surface of the ring member and extending at least partially over the raised central region, wherein the raised central region has an inner surface, wherein the elongate tubular element and the raised central region are separate components that are securely connected to one another along the inner surface of the raised central region to form a unitary tubular element, and wherein the unitary tubular element is formed prior to any portion of the ring member being located over any portion of the raised central region.

2. The apparatus as claimed in claim 1, wherein the slot is formed in the outer surface of the raised central region, and wherein the slot is at least partially covered by the ring member.

3. The apparatus as claimed in claim 2, wherein said slot extends wholly through a length of the raised central region.

4. The apparatus as claimed in claim 1, wherein the slot is formed in the inner surface of the ring member, and wherein the slot is at least partially covered by the outer surface of the raised central region.

5. The apparatus as claimed in claim 1, wherein the slot is formed in the outer surface of the raised central region and wherein the apparatus further comprises:
   a slot formed in the inner surface of the ring member, wherein the slot formed in the outer surface of the raised central region and the slot formed in the inner surface of the ring member are in fluid communication with each other.

6. The apparatus as claimed in claim 1, wherein the raised central region comprises at least one abutment surface extending radially outwardly from the outer surface of the raised central region, and wherein the at least one abutment surface comprises a raised ring region extending circumferentially at least partially around an end region of the raised central region.

7. The apparatus as claimed in claim 1, wherein the ring member is substantially U-shaped or L-shaped or T-shaped having a substantially cylindrical inner bore extending longitudinally through the ring member.

8. The apparatus as claimed in claim 1, wherein an outer surface of the first and second ends of the tubular element are inwardly tapered.

9. The apparatus as claimed in claim 1 wherein said slot is helically shaped.

10. The apparatus as claimed in claim 1 wherein said slot is substantially straight.

11. The apparatus as claimed in claim 10 wherein said straight slot extends longitudinally with respect to a longitudinal axis of the elongate tubular element.

12. The apparatus as claimed in claim 1, wherein the elongate tubular element and the raised central region are integrally formed.

* * * * *